US009242213B1

(12) United States Patent
Aylesworth

(10) Patent No.: US 9,242,213 B1
(45) Date of Patent: Jan. 26, 2016

(54) FORWARD OSMOSIS USING MAGNETIC NANOPARTICLE DRAW SOLUTIONS

(76) Inventor: Terrence W. Aylesworth, Algonquin, IL (US)

( * ) Notice: Subject to any disclaimer, the term of this patent is extended or adjusted under 35 U.S.C. 154(b) by 605 days.

(21) Appl. No.: 13/507,538

(22) Filed: Jul. 6, 2012

(51) Int. Cl.
　　*B01D 63/02*　　(2006.01)
　　*B01D 61/00*　　(2006.01)
　　*C02F 1/44*　　(2006.01)
　　*B01D 61/02*　　(2006.01)
　　*C02F 103/08*　　(2006.01)

(52) U.S. Cl.
　　CPC .............. *B01D 63/02* (2013.01); *B01D 61/002* (2013.01); *B01D 61/005* (2013.01); *B01D 61/027* (2013.01); *C02F 1/442* (2013.01); *C02F 1/445* (2013.01); *B01D 2311/2607* (2013.01); *B01D 2311/2649* (2013.01); *C02F 2103/08* (2013.01)

(58) Field of Classification Search
　　CPC .... B01D 63/02; B01D 61/002; B01D 61/005; B01D 61/027; B01D 2311/2607; B01D 2311/2649; C02F 1/442; C02F 1/445; C02F 2103/08
　　See application file for complete search history.

(56) References Cited

U.S. PATENT DOCUMENTS

| 2,116,920 A | 5/1938 | Wickenden |
|---|---|---|
| 3,171,799 A | 3/1965 | Batchelder |
| 7,914,680 B2 | 3/2011 | Cath et al. |
| 8,815,091 B2 * | 8/2014 | McGinnis ............ B01D 61/002 210/321.74 |
| 2007/0278153 A1 | 12/2007 | Oriard et al. |
| 2010/0051557 A1 | 3/2010 | Etemad et al. |

OTHER PUBLICATIONS

Cath, T.Z., et al, Forward osmosis: Principles, applications, and recent developments, J. Membrane Science, 281,70-87, (2006) Elvevier.
Liu, L.L., et al, Current Patents of Forward Osmosis Membrane Process, Recent Patents of Forward Osmosis membrane Process, Recent Patents on Chem. Eng, 2009, 2, 76-82, Bentham.
Latorre, M., et al, Applications of Magnetic Nanoparticles in Medicine: Magnetic Fluid Hyperthermia, Puerto Rico Health Sciences Journal, vol. 28, 3, Sep. 2009.

* cited by examiner

Primary Examiner — David A Reifsnyder
(74) Attorney, Agent, or Firm — Philip H. Kier

(57) ABSTRACT

A forward osmosis system using submerged hollow fiber membranes, a draw solution of superparamagnetic nanoparticles (preferably an iron oxide core with a silica shell that is chemically treated with a dispersant stabilizing it in a permanent suspension), that produces an osmotic pressure that drives fluid through the semipermeable membrane and a magnetic field produced by either a permanent magnet or solenoid-type electromagnet that is applied to either separate and reuse or to prevent the movement of the magnetic nanoparticles away from the membrane surface area. Since forward osmosis is independent of both the type of membrane (hyper, nano, ultra, or micro) and the fluid type (the fluid being processed can be oil or water-based), it can be widely applied to many fluid processes within the water treatment (wastewater treatment, demineralizing industrial cooling water, and seawater desalination) and non-water treatment industries such as the food and beverage, medical, and chemical industries.

6 Claims, 9 Drawing Sheets

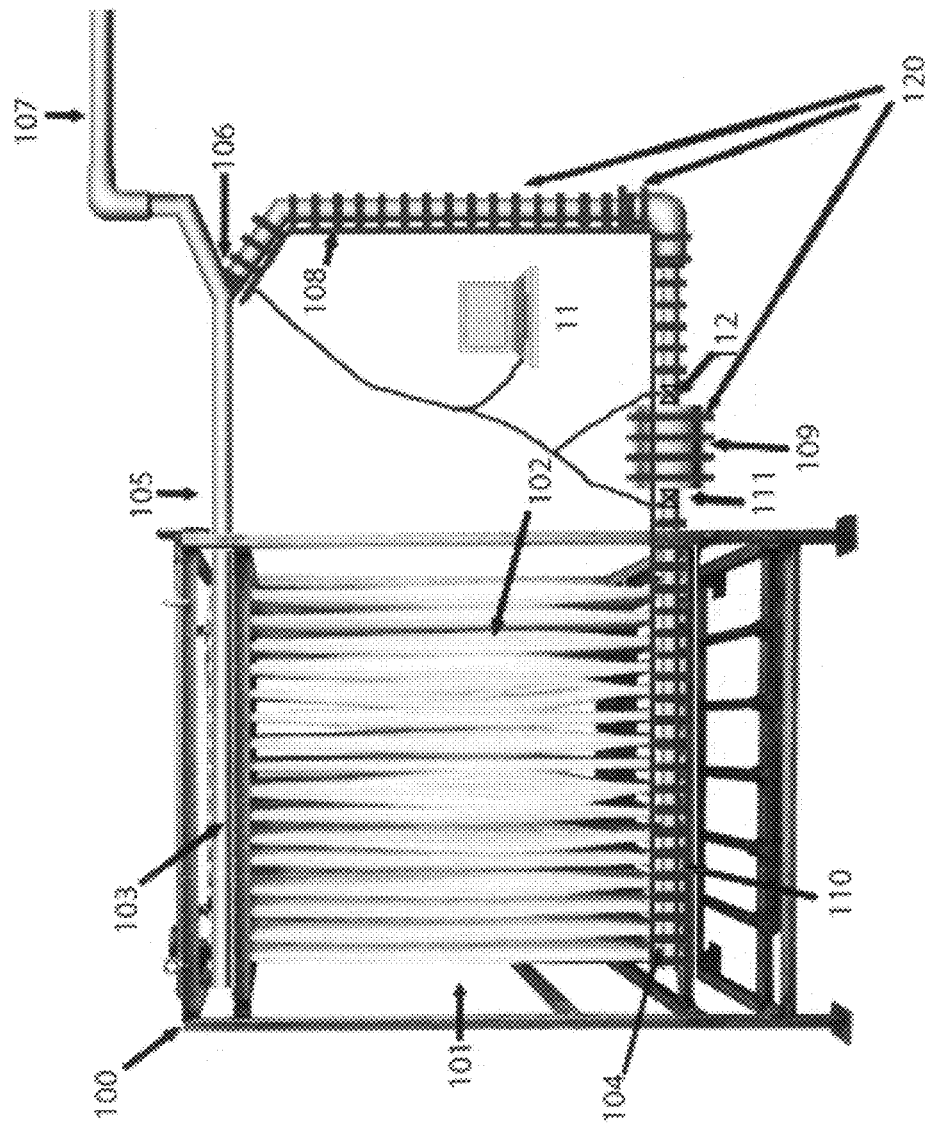

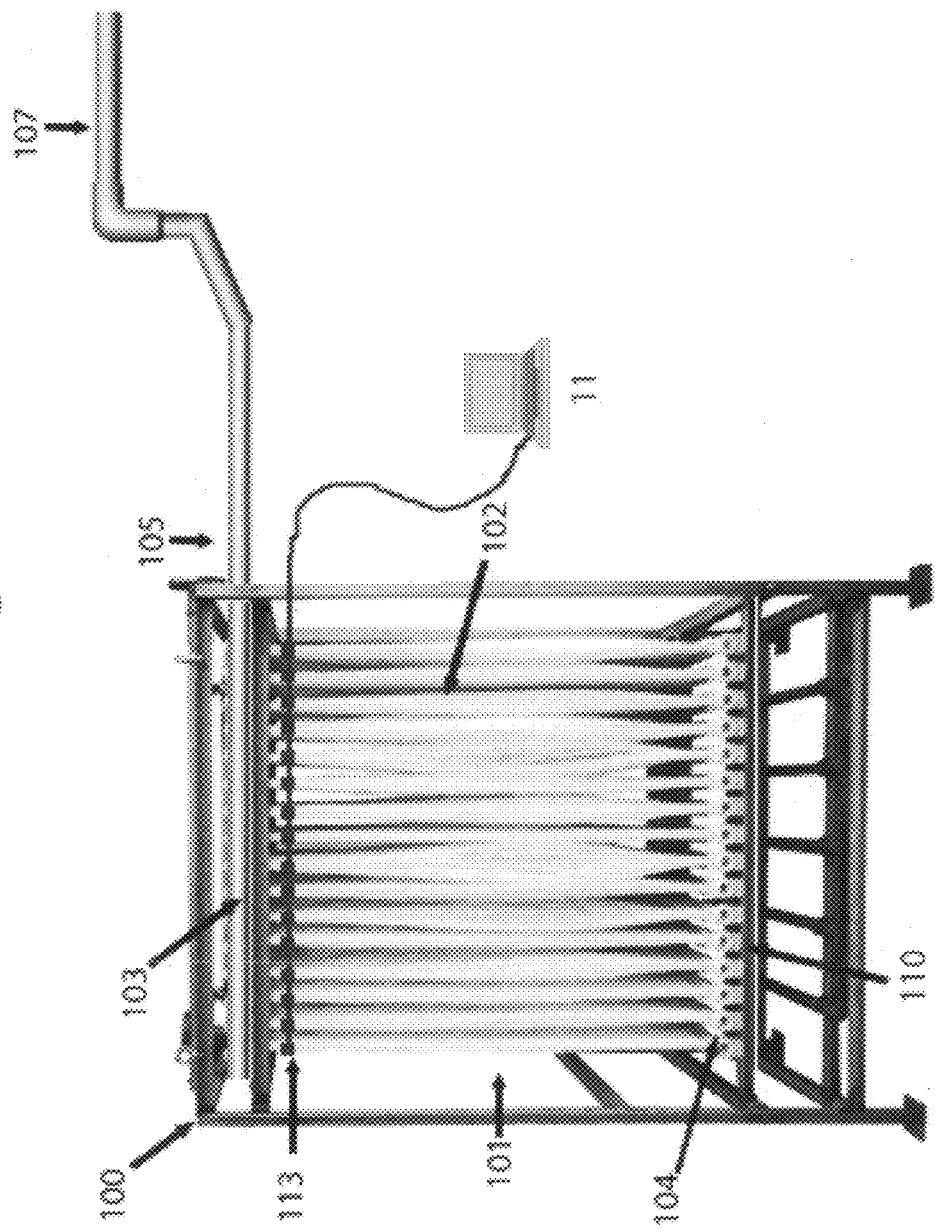

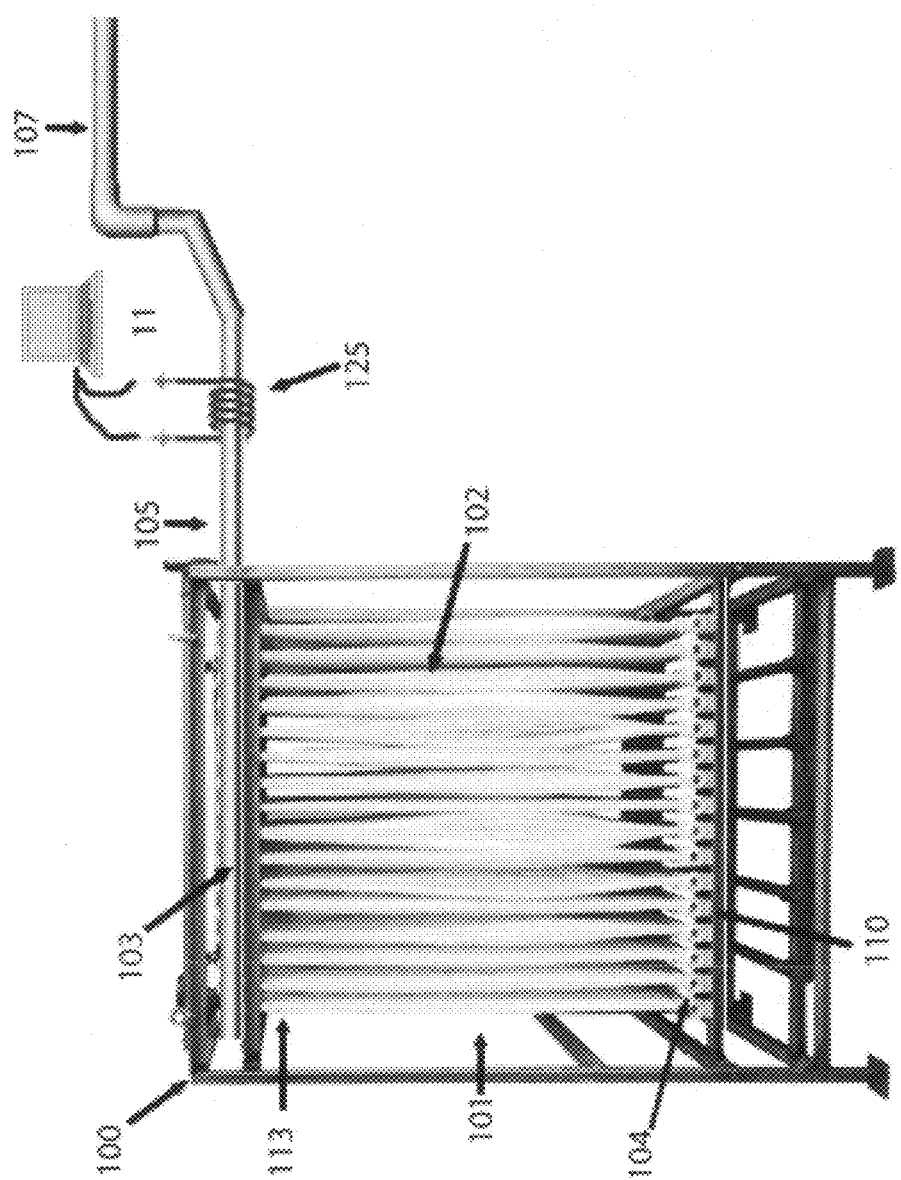

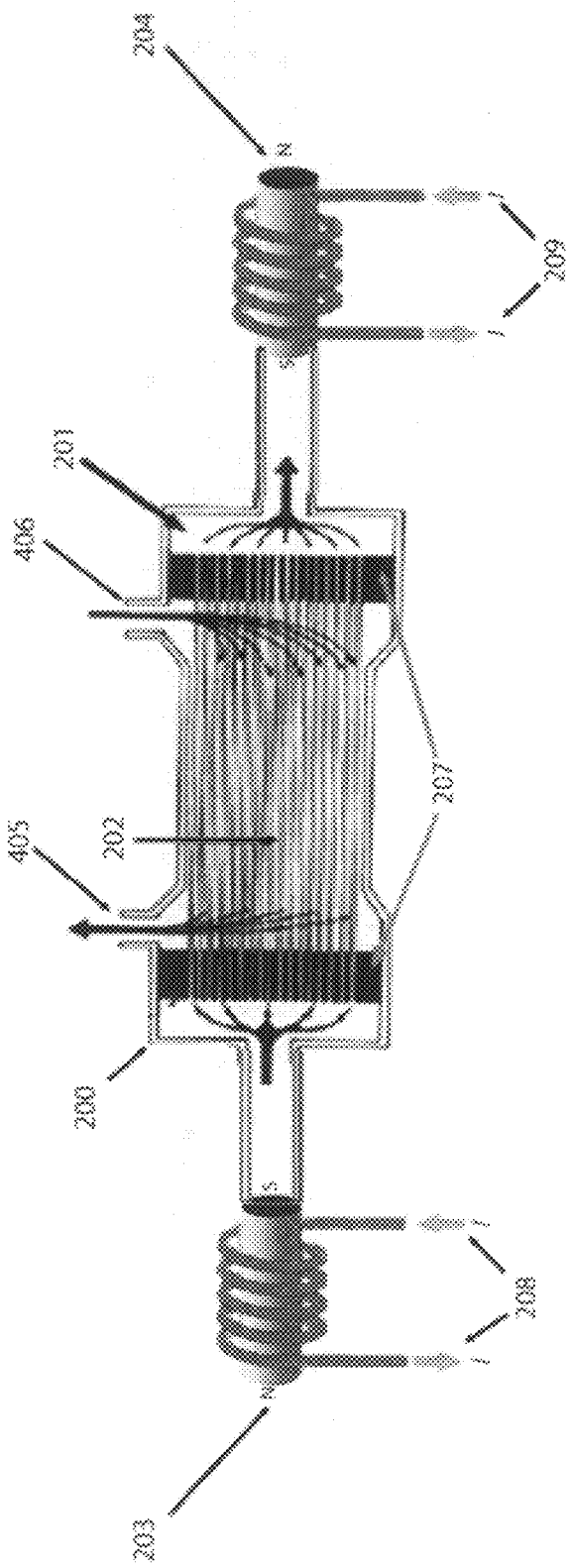

FORWARD OSMOSIS USING MAGNETIC NANOPARTICLE DRAW SOLUTIONS

BACKGROUND OF THE INVENTION

This invention pertains to forward osmosis systems processing of fluids. More particularly, it pertains to forward osmosis systems using hollow fiber membranes and magnetic nanoparticles in a draw solution.

Osmosis is a natural and spontaneous movement of water across a selectively permeable membrane from a region of low solute concentration (pure water) to a region of comparably higher solute concentration such as seawater. The selectivity of the membrane allows for the passage of water while preventing the passage of larger solute molecules and suspended solids. The careful, deliberate selection of the membrane prevents the passage of unwanted molecules. The natural passage of water through the membrane is driven by the difference in the solute concentrations on either side of the membrane. The lower the solute concentration, the greater the driving force of its solvent to permeate the membrane. This driving force is known as osmotic pressure or the net osmotic driving force. There are three types of osmosis. As discussed by Cath et al[1] the most familiar is reverse osmosis (RO), which in the field of water treatment, uses hydraulic pressure to oppose, and exceed, the osmotic pressure of an aqueous feed to produce purified water. A second type of osmosis is forward osmosis (FO), which uses the osmotic pressure differential as the driving force for transport across a semi-permeable membrane, which acts as a separator media. A third type of osmosis is pressure retarded osmosis (PRO) that uses osmotic pressure differences between seawater, or concentrated brine, and fresh water to pressurize the saline stream, thereby converting the osmotic pressure of seawater into a hydrostatic pressure that can be used to produce electricity[2].

The key basis characteristics of an osmosis system are: the type of osmosis (RO, FO, or PRO); the type and composition of the membrane; and the type and composition of the draw solution. FO is preferred to RO for water purification using several criteria. It generally has greater water recovery, has benign environmental effects, is less subject to environmental fouling, and has lower energy demand. Membranes can either be flat sheet membranes in a plate-and-frame configuration or in a spiral-would configuration; or could be tubular. In turn, tubular membranes can be either tubes or hollow fibers. Cath et al[1] discuss the advantages of hollow fiber membranes. They point out that hollow fiber membranes can support high hydraulic pressure without deforming and can be easily packed in bundles directly within a holding vessel. They are also relatively easy to fabricate in modular form. Also, they allow liquids to flow freely on the feed side of the membrane. Other advantages of hollow fiber membranes are they are much cheaper to manufacture and they can have several hundred times the surface area per unit volume than flat sheet spiral wound membranes.

A variety of compositions can be used for the draw solution. In an early commercial application of FO, Wickenden in U.S. Pat. No. 2,116,920 teaches the use of calcium chloride as a draw solution in the concentration of fruit juices. In another early patent, Batchelder in U.S. Pat. No. 3,171,799 teaches the use of a volatile solute, such as sulfur dioxide, in a draw solution for the demineralization of water. Recently interest in draw solutions has centered on those containing magnetic nanoparticles. Magnetic particles in the draw solution have the advantage of being able to be readily separated from the product water of a purification or desalination process with use of magnetic fields. They can also be readily recycled back into the draw solution. A kind of nanoparticles that is currently of interest is a material referred to as Magnetoferritins. As Oriard et al describe in US 2007/0278153, it is magnetite bound to a protein such as ferritin wherein the magnetite is the core and the protein is the spherical cover. The use of magnetite nanoparticles is also taught by Etemad et al in US 2010/0051557 in the context of removing heavy metals from aqueous media by means of adsorption and magnetic capturing. Etemad et al mention that the magnetite is superparamagnetic but does not indicate that they are coated with a protein. Superparamagnetic iron oxide nanoparticles (SPIONs) are also the subject of intense research for various biomedical applications as described by Latorre et al[3].

SUMMARY OF THE INVENTION

This invention is a forward osmosis system using a submerged hollow fiber membrane unit, a draw solution containing superparamagnetic nanoparticles also called ferrofluid, and either a collection of permanent magnets or electromagnets that creates a magnetic field that prevents the loss of the draw solution particles from the membrane surface area. If any of the magnetic nanoparticles are swept away from the membrane surface area with the permeate water, a method of separating and recycling the nanoparticles is also presented.

The magnetic field is created by either a series of permanent magnets or a solenoid-type electromagnet around either a bundle of hollow fibers or a pipe containing the solution of ferrofluid. The solenoid electromagnet is constructed of a coil of insulated wire wrapped horizontally around in the shape of a donut. A single donut-shaped electromagnet can be positioned around the membrane system's permeate collection header, or a series of donut-shaped electromagnets can be rigidly positioned in a lattice framework at the top of the hollow fiber membrane bundles. The vertical hollow fiber membrane strands go through the center hole of the horizontal donut-shaped electromagnets. When an electromagnetic coil is energized, the superparamagnetic nanoparticle (on the inside of the hollow fiber membrane strands) are forced downward, counter-acting the upward flow of nanoparticles with the flow of product water that is continuously permeating the membrane. As an alternative to an electromagnet being positioned around the effluent collection header, at least one permanent magnet could be positioned there to prevent the removal of the nanoparticle from the membrane surface area.

Thus one object of the invention is the use of a superparamagnetic nanoparticle as a draw solute in a forward osmosis system to generate an osmotic driving force of pure water through the membrane. The magnetic characteristic of the draw solute is exploited by either containing or detaining the magnetic nanoparticles within the membrane system with a magnetic field. Alternatively, if magnetic nanoparticles are inadvertently swept away from the membrane system with the product water flow, a nanoparticle separation and recycle loop is also presented. Thus another object of the invention is to use magnetic fields to prevent lose of superparamagnetic particles in the draw solution Still another object of the invention is to use a submerged hollow fiber membrane, as opposed to a flat-sheet, spiral wound membrane, in order to reduce the effects of feedwater Concentration Polarization. A standard industrial scale flat-sheet, spiral-wound membrane consists of a series of cylindrical pressure vessels (each one of which is typically 4 or 8 inches in diameter, and 40-inches long), with several, most often 4 to 6, flat sheet membrane envelopes, each connected to and wrapped around a center of the permeate collection tube. The most common size membrane envelope measures 40-inches long by up to 77 inches wide, for an area of up to 2 square meters of membrane surface area. The membrane sheets are then wrapped around the permeate tube and fitted inside its cylindrical pressure vessel. The feedwater consists of a relatively small volume of water that must travel in between the wrapped layers of membrane envelopes across the entire length of the membrane sheet surface. As the thin layer of feedwater travels between membrane sheets, it becomes more and more concentrated with contaminants due to the continuous, uninterrupted loss of pure water that permeates the membrane, in the absence of bulk feedwater available to re-dilute it. This build-up of contaminant concentration causes the concentration polarization inefficiency to the osmotic process. In embodiments that have electromagnets submerged within the feedwater of the membrane system, the electromagnetic ring fits loosely around the bundle of hollow fiber membrane strands to allow bulk feedwater increased access to re-dilute feedwater at membrane surface area.

BRIEF DESCRIPTION OF THE DRAWINGS

FIG. 1a is a view of the system with a draw solution recycle loop but without magnetic field application within the osmosis unit for containment of the magnetic particles within the membrane system.

FIG. 1b is a view of the system with a magnetic field applied within the membrane system for containment of the ferrofluid within the membrane system, but without draw solution recycle loop.

FIG. 1d is a view of the system with magnetic field control at the effluent collection header of the osmosis unit but without draw solution recycle loop.

FIG. 1e is a cutaway view of a hollow fiber cartridge housing configuration with the ferrofluid within the hollow fiber membrane strands.

DETAILED DESCRIPTION OF THE INVENTION

Figure 1C:
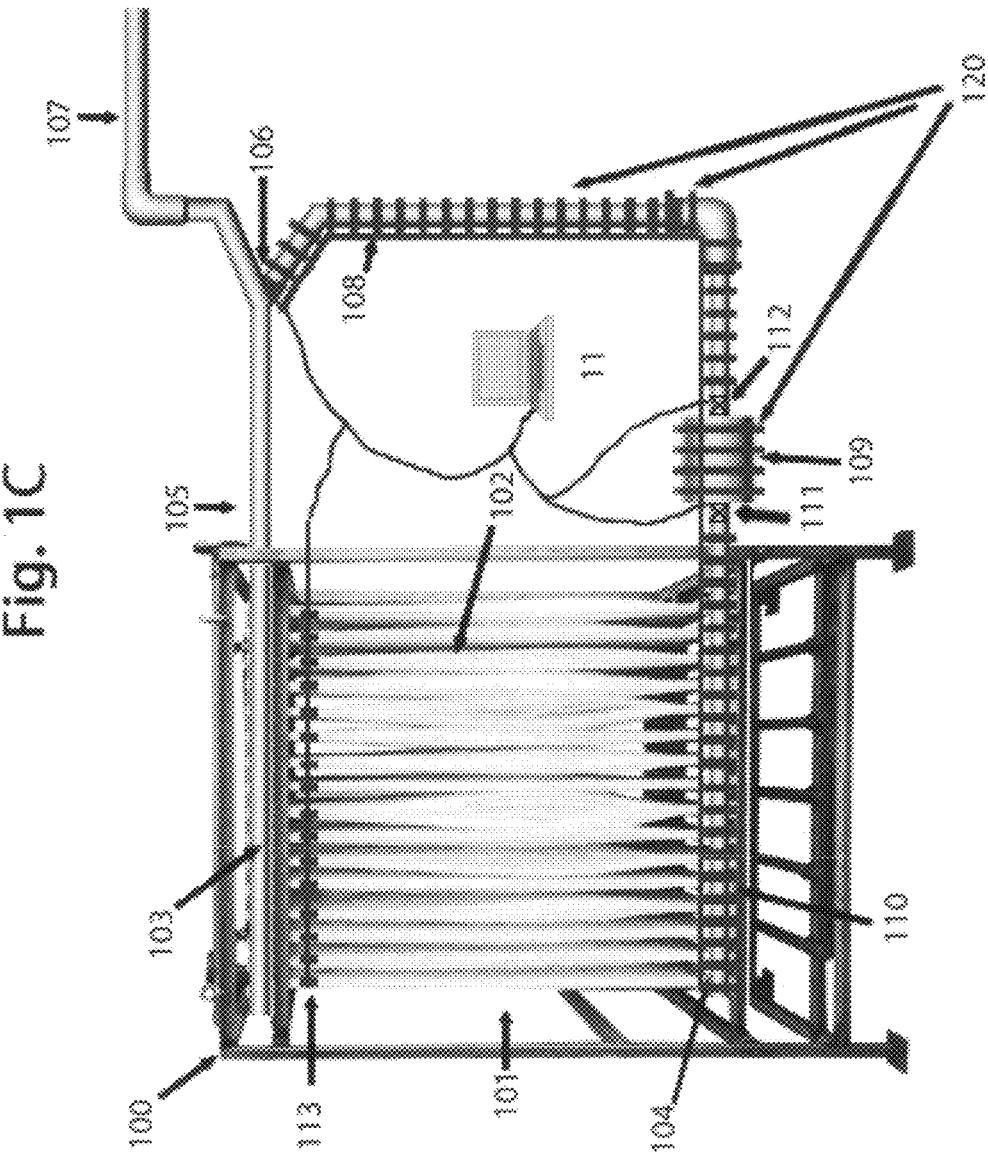
FIG. 1c is a view of the system with magnetic field applied within the osmosis unit and also with draw solution recycle loop.

For the embodiments shown in FIG. 1a through FIG. 1f, feedwater may be either wastewater or industrial cooling water to be purified or demineralized or seawater to be desalinated. In FIG. 1a, a forward osmosis membrane unit 102 is shown to be submerged in feedwater 101 within an enclosure having water-tight walls and a metal frame 100. When used for desalination, the membrane system can either be placed in-situ in seawater (be installed pier-side). In-situ use in a natural body of seawater is preferred as it minimizes Concentration Polarization (CP) because the more concentrated seawater near the membrane surface would be re-diluted by the surrounding bulk seawater. The natural movement of seawater from wave action and current flow has further dilutive effects.

The heart of the invention is the submerged hollow fiber forward osmosis (FO) membrane unit 102, utilizing a magnetic nanoparticle draw solution and engineered magnetic separation and recycle loop, (or as in the second, third, forth, fifth, and sixth embodiments, either a permanent or an electro-magnet produced magnetic field, for the containment or retainment of the nanoparticles within the membrane system). The forward osmosis membrane system consists of a multiplicity of submerged hollow fiber membrane bundles. Each bundle contains a large number, typically 500 to 1000 hollow fiber tubes. Each bundle is 'potted' into one of many (the figure shows 16 of them) top headers (behind 103) and one of many bottom headers (behind 104) and sealed such that the fiber lumen is open to the headers and the feedwater is prevented from leaking into either header or into the center core of a hollow fiber. The hollow fiber tubes are small with an inside diameter in the range of 10 to 100 microns (a micron is one-millionth of a meter) and an outside diameter in the range of 25 to 200 microns. Smaller diameter hollow fiber tubes are preferred to larger diameter fiber tubes by having more membrane surface area per unit volume of FO membrane. The walls of the hollow fiber tubes have pores and thus function as a semi-permeable membrane. These pores are of such a size as to prevent passage of unwanted dissolved and suspended solids through the walls of the hollow fibers but allow the feedwater to pass into its interior.

The size of the pores determines the types of contaminants removed. Microfilter (MF) pores with diameters in the range of 0.01 to 1 microns typically remove clay, bacteria, large viruses, and suspended solids. Ultrafilter (UF) pores with diameters in the 0.001 to 0.01 micron range typically remove viruses, proteins, starches, colloids, silica, organics, and dyes. Nanofilter (NF) pores with diameters in the range of 0.0001 to 0.001 microns typically remove sugar, pesticides, herbicides and some divalent ions. Reverse osmosis, or hyperfilters, with pore diameters (of 0.1 to 1.0 nanometers, where 1 nanometer=0.001 micron) are capable of removing monovalent salts. The most common hollow fiber membrane materials, owing to their competitive performance and economic characteristics are cellulose acetates, nitrates, and esters (CA, CN, and CE), polysulfone (PS), polyether sulfone (PES), polyacrilonitrile (PAN), polyamide, polyimide, polyethylene and polypropylene (PE and PP), polytetrafluoroethylene (PTFE), polyvinylidene fluoride (PVDF), polyvinylchloride (PVC). RO (hyperfilter) and some nanofilter membranes can be used for desalination. Nano, ultra and microfilters can be used for wastewater treatment, depending on the particle size that is the object of the wastewater treatment.

The draw solution should consist of pure water with a solution of superparamagnetic nanoparticles in suspension. Paramagnetism describes the characteristic that the nanoparticles are magnetic only while within an externally applied magnetic field and show no such magnetic characteristic absent the magnetic field. Therefore, the particles would not show a magnetic attraction to each other, but rather only in the direction of an external magnetic force field. The prefix 'super' in superparamagnetic refers to the nanoparticle's strength of magnetization and that it is many times greater than the magnetization of an ordinary paramagnetic particle. Superparamagnetism occurs when the nanoparticle is sufficiently small (~10 nm) so that the surface area is large relative to the particle's mass.

The types of superparamagnetic nanoparticles that are preferred have an iron oxide core with a silica shell. These are called superparamagnetic iron oxide nanoparticles, or SPIONs. Some of the other materials used to make the core of superparamagnetic nanoparticles are pure metals such as Fe, Ni and Co, and alloys such as $Fe_3O_4$, $Fe_2O_3$, $MgFe_2O_4$, $MnFe_2O_4$, $CoFe_2O_4$, $CoPt_3$, FePt, $FePt_3$ and CoO.

The silica shell around the SPION provides it with chemical stability by preventing the iron oxide core (preferably magnetite [$Fe_3O_4$], or maghemite [$Fe_2O_3$]), from oxidizing, preventing them from agglomerating, or sticking to a neighboring particle and acts as a base that a functionalizing chemical dispersant coating can adhere to. Other inorganic shell materials of the core-shell nanoparticle include carbon, precious metals such as silver and gold, or their oxides, which can be created by gentle oxidation of the outer shell of the nanoparticles, or additionally deposited, such as $Y_2O_3$ (Yttrium oxide).

Chemical dispersants, also called surface ligands or polymers, are used to 'functionalize' the nanoparticle and thus maintain it in a stable suspension. In general, surfactants or polymers can be chemically anchored or physically adsorbed on magnetic nanoparticles, which creates repulsive forces (mainly as steric repulsion) to balance the magnetic and the van der Waals attractive forces acting on the nanoparticles. Thus, by steric repulsion, the magnetic particles are stabilized in suspension. When forming a stable, colloidal suspension, the nanoparticles are referred to as dissolved or hydrophilic. Polymers containing functional groups, such as carboxylic acids, phosphates, and sulfates, can bind to the surface of the nanoparticle. Suitable polymers for coating include poly(pyrrole), poly(aniline), poly(alkylcyanoacrylates), poly(methylidene malonate), and polyesters, such as poly(lactic acid), poly(glycolic acid), poly(e-caprolactone), and their copolymers.

It is preferred that the paramagnetic nanoparticle be larger than the membrane's pores to prevent a nanoparticle from penetrating a membrane, yet small enough to produce a large osmotic pressure across the membrane. The state-of-the-art limit to how small the current size of such a particle can be is 2 to 3 nanometers.

Feedwater permeating the membrane is hydraulically forced to the top series of headers because the bottom headers are valved closed (in embodiments 1 and 3 that contain a recycle loop) during normal operation. Each membrane bundle is potted into a top header (of which there are approximately 16 shown in the figure), and each top header has a fitted connection to the collection header 103. Therefore, there is a continuous flow of water that originates as feedwater, that permeates through the hollow fiber membrane, is collected in the series of top headers, and flows into the collection header 103. The permeate exits the submerged membrane unit through a water-tight fitting collection header 105.

A portion of the magnetic nanoparticles will be diluted and swept away from the inside of the membrane system by the in-flow of permeate water. In one embodiment, shown in FIG. 1a, a magnetic separation and recycle loop exploits the magnetic properties of the nanoparticle draw solution to separate them from the product water. As the permeate water and magnetic nanoparticle solution effluent exits the submerged membrane system through the effluent collection header 105, it approaches a "Y" pipe 106, with one fork of the "Y" having a relatively strong magnetic field applied to attract the magnetic nanoparticles and separate them from the permeate or product water flow 107. The separated magnetic nanoparticles are conveyed away from the "Y" pipe by way of a recycle pipe 108, by electromagnetic bands 120, wrapped around the recycle pipe. The magnetic bands are solenoid-type electromagnets, consisting of a continuous coil of insulated wire carrying a direct electrical current. Each electromagnetic band is electrically connected and energized continuously by controller 11 to maintain a continuous flow of magnetic nanoparticles through open valve 112 to a Recycle Accumulation Section (RAS), 109. The RAS is an isolatable compartment that may also be separated and substituted with a compartment that consists of a new supply of ferrofluid. This ability to separate and substitute a compartment filled with ferrofluid is the method of servicing or changing the ferrofluid within the Forward Osmosis system. The product water effluent would flow along the other fork 107 in the "Y" pipe and be directed to its end use point or collection tank.

Figure 2:
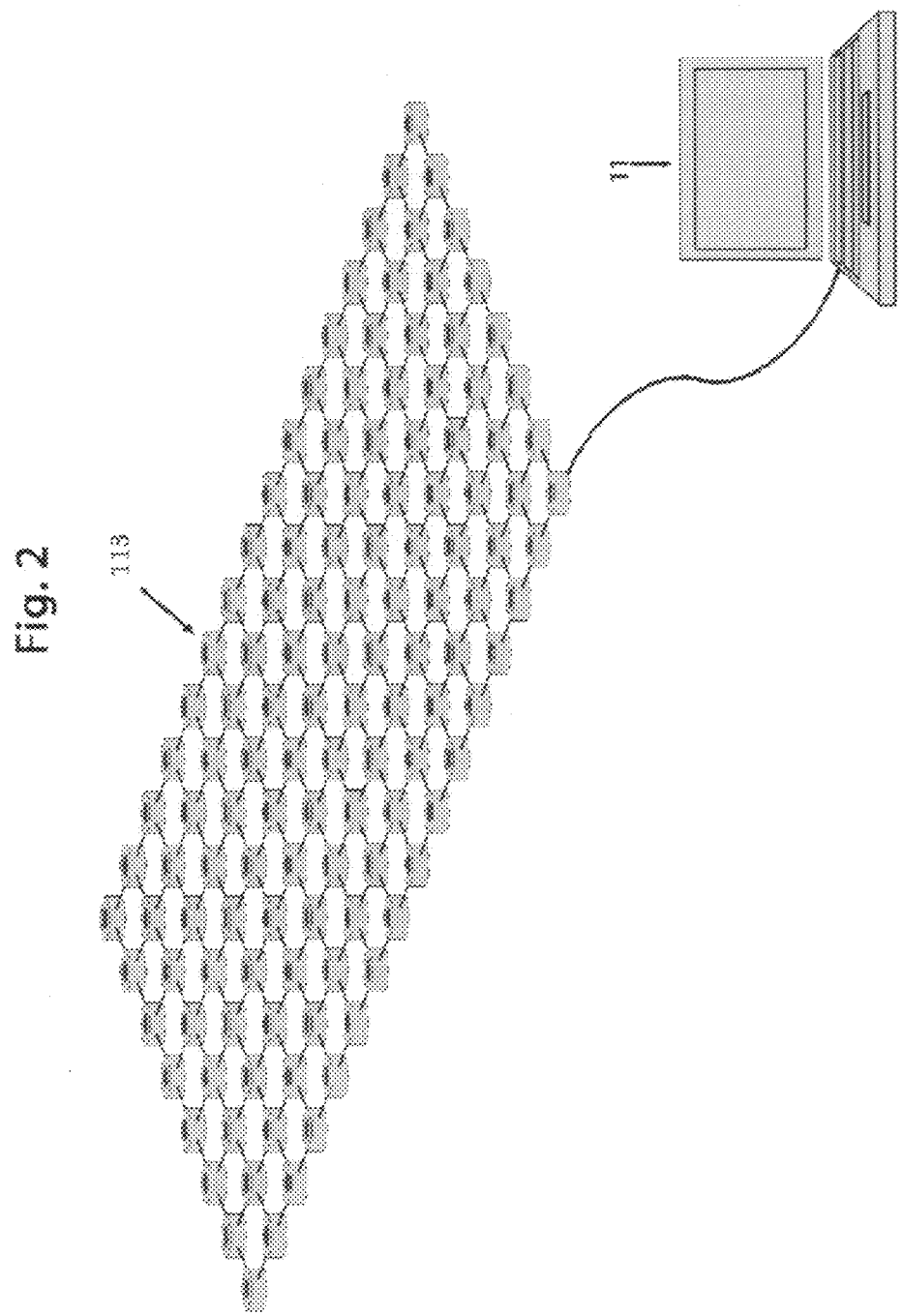
FIG. 2 is a perspective view of a lattice of electromagnets rings attached to a controller.

The recycled nanoparticles are continuously conveyed down the recycle pipe 108 until they reach valve 111, which would be closed during the normal operating mode. The nanoparticles therefore accumulate in the RAS 109. Once the RAS is full of nanoparticles, valve 112 closes, and valve 111 opens and the electromagnetic bands around the RAS 109, the bottom collection header 110, and the bottom headers 104, convey the magnetic nanoparticles to the potted membrane bundles for injection into the hollow fiber membranes. This is referred to as the nanoparticle reinjection mode. Once the RAS is emptied, valve 111 closes, and valve 112 opens, and normal operating mode resumes In a second embodiment, FIG. 1b, the use of electromagnets rigidly and electrically connected in a lattice 113, prevents the paramagnetic nanoparticles from exiting the hollow fiber membrane system. The electromagnetic lattice near the top of the membrane unit, shown in FIG. 2, is continuously energized by being connected to controller 11 to create a magnetic field with the corresponding lines of flux that point in the downward direction so as to retain the nanoparticles within the membrane unit. This prevents the nanoparticles from being forced out through the top of the hollow fiber membrane system.

Note that in FIG. 1b, recycle pipe 108 and "Y" pipe 106 (from FIG. 1a) are eliminated and collection header 105 leads directly to a collection point or end use 107. Each electromagnet is round with a round hole in its center with a membrane fiber bundle threaded through this hole. As shown in FIG. 2, every electromagnet ring is on the same electrical circuit so that each of the electromagnets can be energized simultaneously. Each electromagnetic ring is rigidly connected to its neighboring electromagnets for stability and to prevent the electromagnets from moving back and forth when they are energized. Such reduced movement will cut down on wear and tear.

Figure 3:
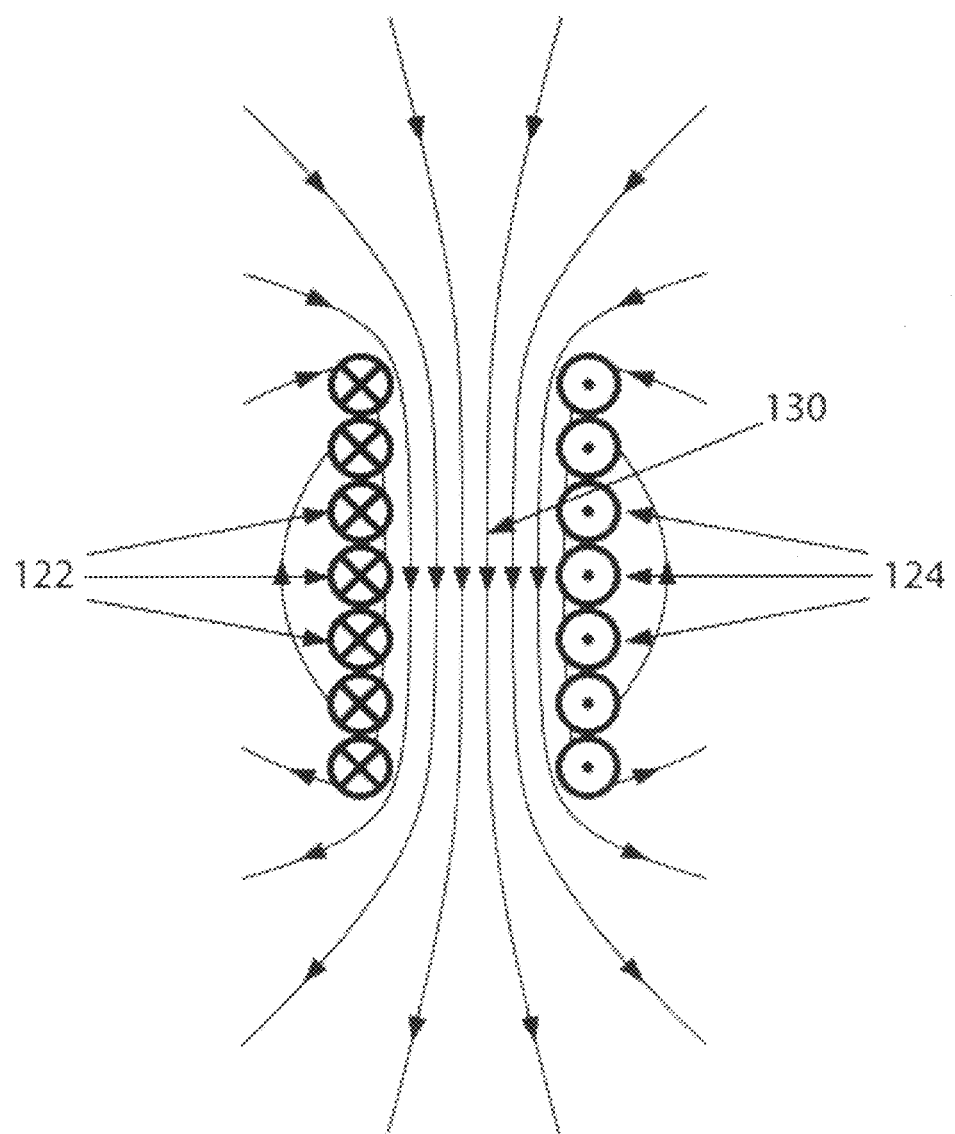
FIG. 3 is a view of a housing with multiple permanent magnets for magnetic field control at the effluent collection header.

Each electromagnet is a solenoid (a coil of insulated wire wrapped horizontally around the fiber bundle). FIG. 3 shows a cross section through the center of a solenoid coil. The X's 122 are wires in which current is moving into the page, and the dots 124 are wires in which the current is coming out of the page. The lines of magnetic flux are represented by reference number 130. From classical electro-magnetism, using the right-hand rule, where the fingers point in the direction of the current, the thumb determines the direction of the magnetic force, which in this drawing, is in the downward direction. Superparamagnetic nanoparticles inside hollow fiber membrane strand bundles, surrounded by such an electromagnetic ring, would also be forced in the downward direction and thus counter-act the upward flow of nanoparticles being swept away by the permeate. Because the electromagnets force the nanoparticles downward, they need only be located near the top of the membrane system.

The electromagnetic solenoids fit loosely around the fiber bundles to enable water to freely access the membrane fibers. This free access of feedwater will maximize the re-dilution of the concentrated feedwater at the membrane surface, thus reducing Concentration Polarization.

Figure 4:
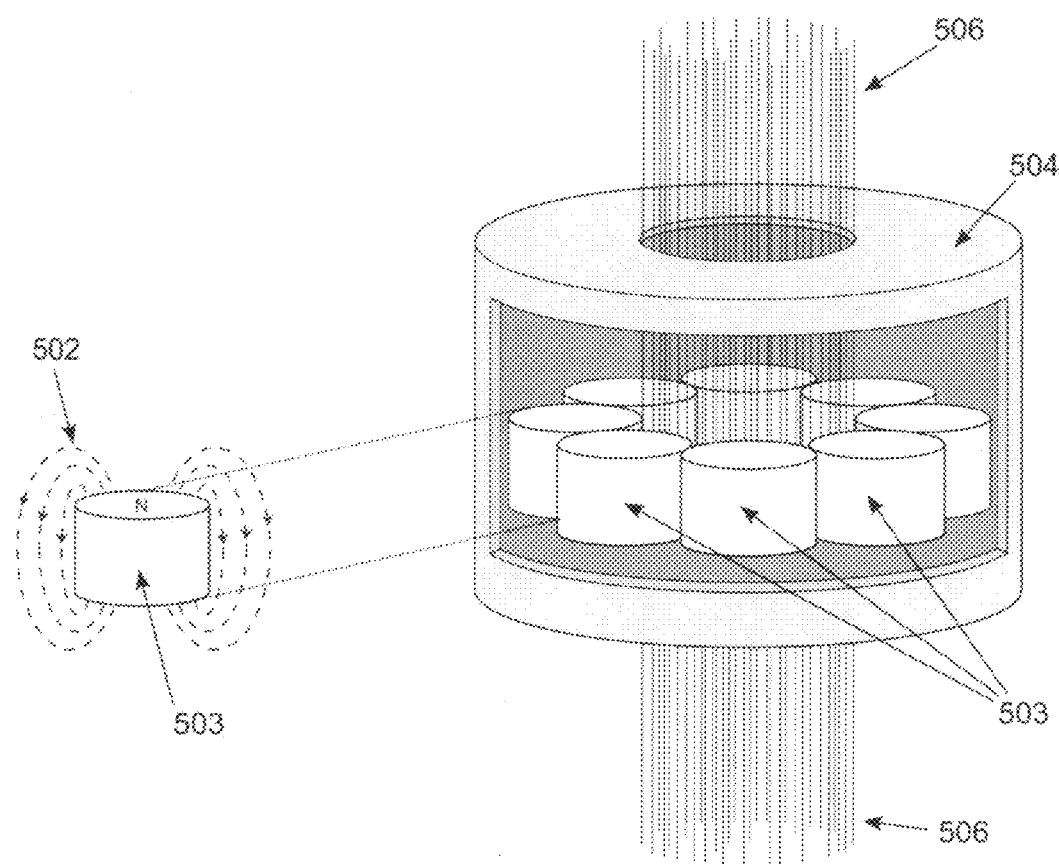
FIG. 4 is a view of the housing for a series of permanent magnets

As an alternative, permanent magnets can be used instead of electromagnets. FIG. 4 shows a series of 8 cylindrical permanent magnets 503, in a housing 504 oriented around the circumference of a bundle of hollow fiber membranes 506. Each magnet is oriented with the north pole on top so that its lines of magnetic flux 502 are pointed downward at the center of the permanent magnet housing. The permanent magnet housing may also be fitted around an effluent pipe. Eight magnets are shown in FIG. 4 as an example, other numbers of magnets could also be used.

The third embodiment, shown in FIG. 1c, utilizes both the lattice of electromagnets to prevent the loss of nanoparticles from the membrane unit, and the separation and recycle pipe 108 for any potential nanoparticles that are lost from the membrane unit.

The fourth embodiment, shown in FIG. 1d is similar to the second embodiment shown in FIG. 1b in that it does not have draw solution recycle. However, instead of having a lattice of electromagnets or permanent magnets near the top of the osmosis unit, it has a single solenoid-type electromagnet 125 on the osmosis unit's effluent collection header 105. Again, instead of using an electromagnet, the magnetic field could be produced by a series of permanent magnets as shown in FIG. 4.

The four embodiments described above are suited only for in situ water demineralization, either desalination of seawater, or as applied to industrial cooling water, either make-up water demineralization or cooling tower side-stream demineralization. The following two cartridge embodiments have general application that can range from hemodialysis (as an artificial kidney), for medical patients suffering from renal insufficiency to liquid food processing applications.

The fifth embodiment, shown in FIG. 1e, is a hollow fiber membrane system in a cartridge housing configuration 200 with superparamagnetic nanoparticles within the hollow fiber membrane strands. The hollow fiber membrane tubes 202, are potted in manifold sheets 207, such that the feed fluid enters the cartridge through port 406, and the resultant leaves the cartridge through port 405. The draw solution consists of water and ferrofluid. The water enters the cartridge through port 203 and exists through port 204. Once inside the cartridge the draw solution water enters the interior of the hollow fiber tubes where it mixes with superparamegnetic nanoparticles. These nanoparticles are kept within the hollow fiber tubes by solenoid electromagnets, 208 and 209, that are oriented such that their magnetic lines of flux are directed toward the inside of the cartridge, thus maintaining the superparamagnetic nanoparticles within the cartridge housing and on the inside of the hollow fibers. As before, the solenoid electromagnet could be replaced by permanent magnets. The volume within the cartridge that is on the hollow fiber side of the membrane, separated by a either membrane or manifold sheet, from the feed solution is shown as reference number 201.

Figure 1F:
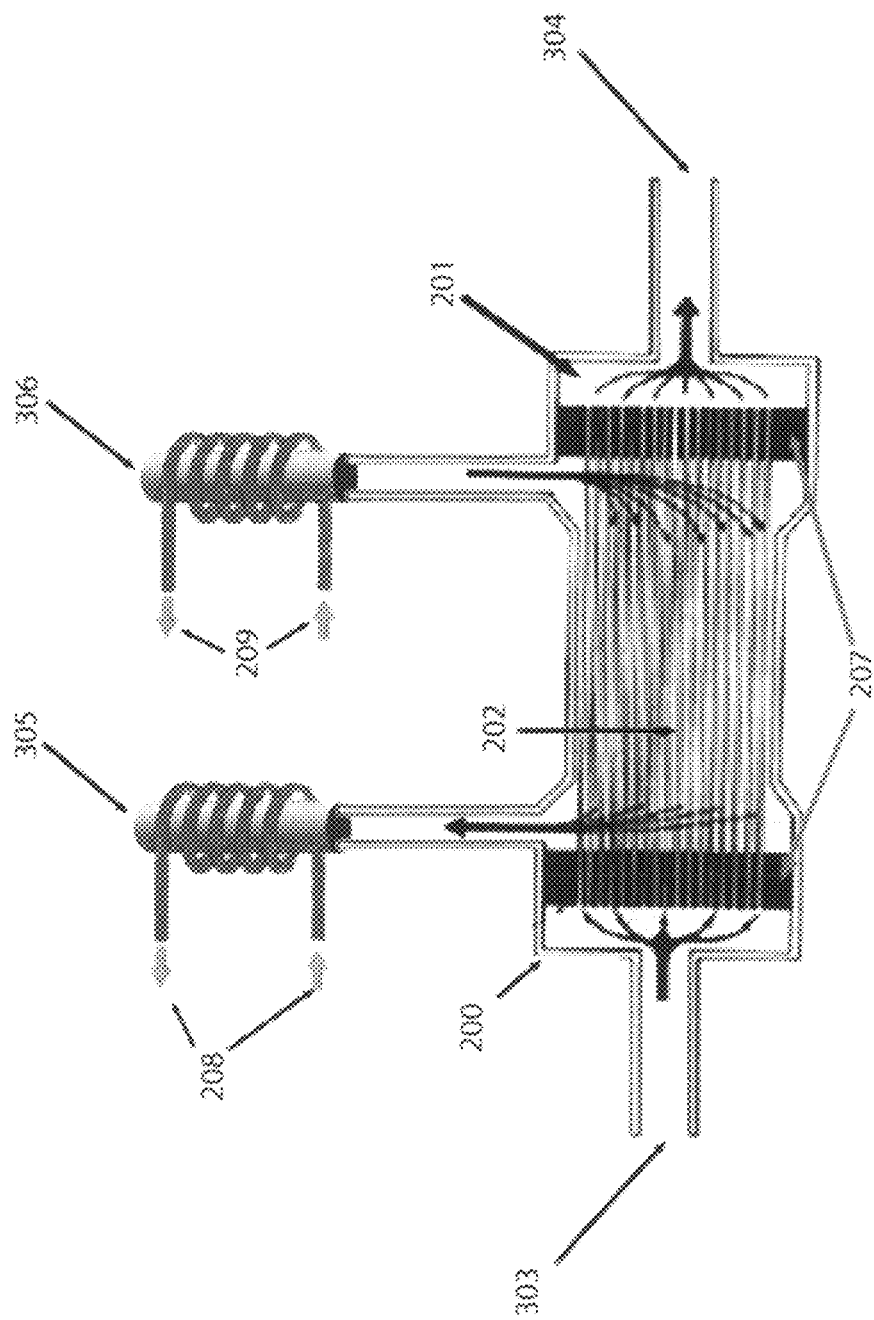
FIG. 1f is a cutaway view of a hollow fiber cartridge housing configuration with the ferrofluid on the cartridge side of the membrane strands.

The sixth embodiment as shown in FIG. 1f, is a hollow fiber membrane system in a cartridge configuration, 210, with the draw solution and its magnetic nanoparticles maintained on the outside of the hollow fiber membrane strands 202, that is on the shell or cartridge side. The hollow fiber strands 202 are again potted in the manifold sheets 207, such that the draw solution is fed to the membrane cartridge through port 306, and the draw solution with the corresponding permeates that have been drawn through the membrane leaves the cartridge through port 305. The fluid to be processed enters the cartridge through port 303, enters the interiors of the hollow fiber tube membranes and flows in a direction counter to that of the draw solution and permeate leaves the cartridge through port 304. Again solenoid electromagnets 208 and 209 keep the nanoparticles within the hollow fiber tubes. For this configuration the draw solution can be either water or oil based.

For the embodiment shown in FIG. 1e, the inlet port and the outlet port for the draw and outlet port for the draw solution, are 406 and 405, respectively. These electromagnets are wound such that magnetic north is away from the interior of the cartridge to keep the superparamagnetic nanoparticles in the draw solution from leaving the cartridge.

I claim:

1. A forward osmosis system for water purification and desalination comprising:
a rigid enclosure filled with feedwater;
an array of bundles of hollow fiber tubes, each bundle having a multiplicity of hollow fiber tubes and each hollow fiber tube having a multiplicity of pores, each hollow fiber tube acting as a semi-permeable membrane submerged in the feedwater, the hollow fiber tubes permeated by the feedwater and each bundle securely attached to a bottom header and a top header;
a draw solution consisting of pure water with a solution of superparamagnetic nanoparticles in suspension, the superparamagnetic nanoparticles having a diameter greater than the diameter of the pores in the hollow tubes;
a common effluent collection header with an end attached to the top headers and another end attached to a collection means; and
magnetic field generators oriented to keep the superparamagnetic nanoparticles in the draw solution within the array of bundles of hollow fiber tubes.

2. A forward osmosis system as set forth in claim 1 wherein the superparamagnetic nanoparticles have an iron oxide core and a silica shell coated with a dispersant, such that the nanoparticle solution forms a colloidal suspension with high osmotic potential.

3. A forward osmosis system as set forth in claim 2 wherein the magnetic field generators are a lattice of electromagnets deployed in the array of bundles of hollow fiber tubes near the top header, each electromagnet having a hole through which a bundle is threaded and each electromagnet being on the same electrical circuit that is attached to a controller.

4. A forward osmosis system as set forth in claim 2 wherein the magnetic field generators are at least one permanent magnet in an annular housing surrounding each bundle in the array of bundles of hollow fiber tubes, the permanent magnets deployed near the top header.

5. A forward osmosis system as set forth in claim 2 further comprising an electromagnet on the effluent collection header.

6. A forward osmosis system as set forth in claim 2 further comprising at least one permanent magnet in a housing on the effluent collection header.

* * * * *